US008994529B2

(12) United States Patent
White (10) Patent No.: US 8,994,529 B2
(45) Date of Patent: Mar. 31, 2015

(54) MOSQUITO MISTING SYSTEM AND METHOD FOR USING SAME

(76) Inventor: Jeffrey C. White, Katy, TX (US)

(*) Notice: Subject to any disclaimer, the term of this patent is extended or adjusted under 35 U.S.C. 154(b) by 674 days.

(21) Appl. No.: 12/795,782

(22) Filed: Jun. 8, 2010

(65) Prior Publication Data

US 2010/0312403 A1    Dec. 9, 2010

Related U.S. Application Data

(60) Provisional application No. 61/185,189, filed on Jun. 8, 2009.

(51) Int. Cl.
*G08B 21/00* (2006.01)
*A01M 13/00* (2006.01)
*A01M 1/20* (2006.01)

(52) U.S. Cl.
CPC .............. *A01M 13/00* (2013.01); *A01M 1/2022* (2013.01); *Y10S 43/90* (2013.01)
USPC .......... 340/540; 239/329; 239/332; 43/132.1; 43/900

(58) Field of Classification Search
CPC ....... G08B 3/10; G08B 25/14; G08B 13/1672
USPC ........... 340/540; 239/329, 332; 43/132.1, 900
See application file for complete search history.

(56) References Cited

U.S. PATENT DOCUMENTS

| | | | | |
|---|---|---|---|---|
| 4,671,435 A | * | 6/1987 | Stout et al. | 222/646 |
| 7,066,218 B1 | | 6/2006 | Fleming | |
| 7,320,439 B2 | * | 1/2008 | Davis et al. | 239/329 |
| 7,540,433 B2 | | 6/2009 | Fleming | |
| 7,706,926 B2 | * | 4/2010 | Peterson | 700/283 |
| 2003/0177841 A1 | * | 9/2003 | Skinner | 73/861 |
| 2005/0061752 A1 | * | 3/2005 | Tarara et al. | 210/739 |
| 2006/0149509 A1 | * | 7/2006 | Chyun | 702/189 |
| 2006/0267755 A1 | * | 11/2006 | Albert et al. | 340/521 |
| 2008/0067263 A1 | * | 3/2008 | Modlin et al. | 239/70 |
| 2009/0112664 A1 | * | 4/2009 | Sprogis et al. | 705/7 |
| 2010/0224697 A1 | * | 9/2010 | Modlin et al. | 239/102.1 |

* cited by examiner

*Primary Examiner* — George Bugg
*Assistant Examiner* — Anthony D Afrifa-Kyei
(74) *Attorney, Agent, or Firm* — Kenneth A. Roddy (57) ABSTRACT

Embodiments described herein comprise an apparatus and method for controlling and monitoring a mosquito misting system. The apparatus includes a chemical reservoir, a delivery system, a spray system, one or more sensors, a communication network and a misting management unit. The sensors may detect normal and abnormal operations of the misting system and send this data to the misting management unit. The misting management unit may then analyze the data and determine the problem. If the problem can be fixed without personnel, the misting management unit may simply adjust the system and fix the problem. If the problem requires personnel, the system may automatically schedule the service call based on a number of criteria.

17 Claims, 5 Drawing Sheets

MOSQUITO MISTING SYSTEM AND METHOD FOR USING SAME

CROSS REFERENCE TO RELATED APPLICATION

This application claims the benefit of U.S. Provisional Application No. 61/185,189, filed Jun. 8, 2009, the entire contents of which are hereby incorporated by reference.

BACKGROUND

Embodiments of the inventive subject matter generally relate to the field of insect control, and more particularly to a system and method for monitoring and controlling a misting system for controlling the insect population near the misting system.

The mosquito control industry has in the past relied on personal repellants that an individual sprays on themselves in order to prevent mosquito bites. The spray must be applied before entering a mosquito infested area to be effective. The spray is also greasy and sometime has a strong odor. Further, mosquito populations have been controlled by spraying pesticides on the streets in a particular area. The spray is typically applied by a truck driving through a neighborhood with a large fogger spraying insecticides out of the rear of the truck. The truck may reduce the local mosquito population; however, it is limited in its application to locations near the streets in the area. Recently mosquito misting systems have been used to reduce the mosquito populations. The mosquito misting system pump insecticides and/or repellents through nozzles located in a desired area. The system may be set on a timer to spray at intervals throughout the day, week or month.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details. The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Embodiments described herein comprise a system and method for a mosquito misting control and monitoring system, or mosquito misting system. The mosquito misting system allows a user, owner and/or operator to control and monitor the functions of the mosquito misting system. A mosquito misting unit of the mosquito misting system may allow for the control of the spray system, and the chemical system. The mosquito misting system may further allow for the monitoring of the systems associated with the mosquito mister. The mosquito misting system may alert the user, owner and/or operator of required maintenance, system failures, and conditions of the mosquito misting system.

In some embodiments the mosquito system detects a condition of the mosquito misting system. The mosquito misting system may then determine if the condition requires action. The mosquito misting system may then determine the course of action to be taken to address the condition. The mosquito misting system may compare the condition to historical data of the mosquito misting system. If the mosquito misting system determines that action is required based on the detected condition, the mosquito misting unit may take action to fix the problem. For, example, the mosquito misting unit may alert the owner of the mosquito misting system, may alert a maintenance operator, may adjust an operation condition of the mosquito misting system and the like.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 1:
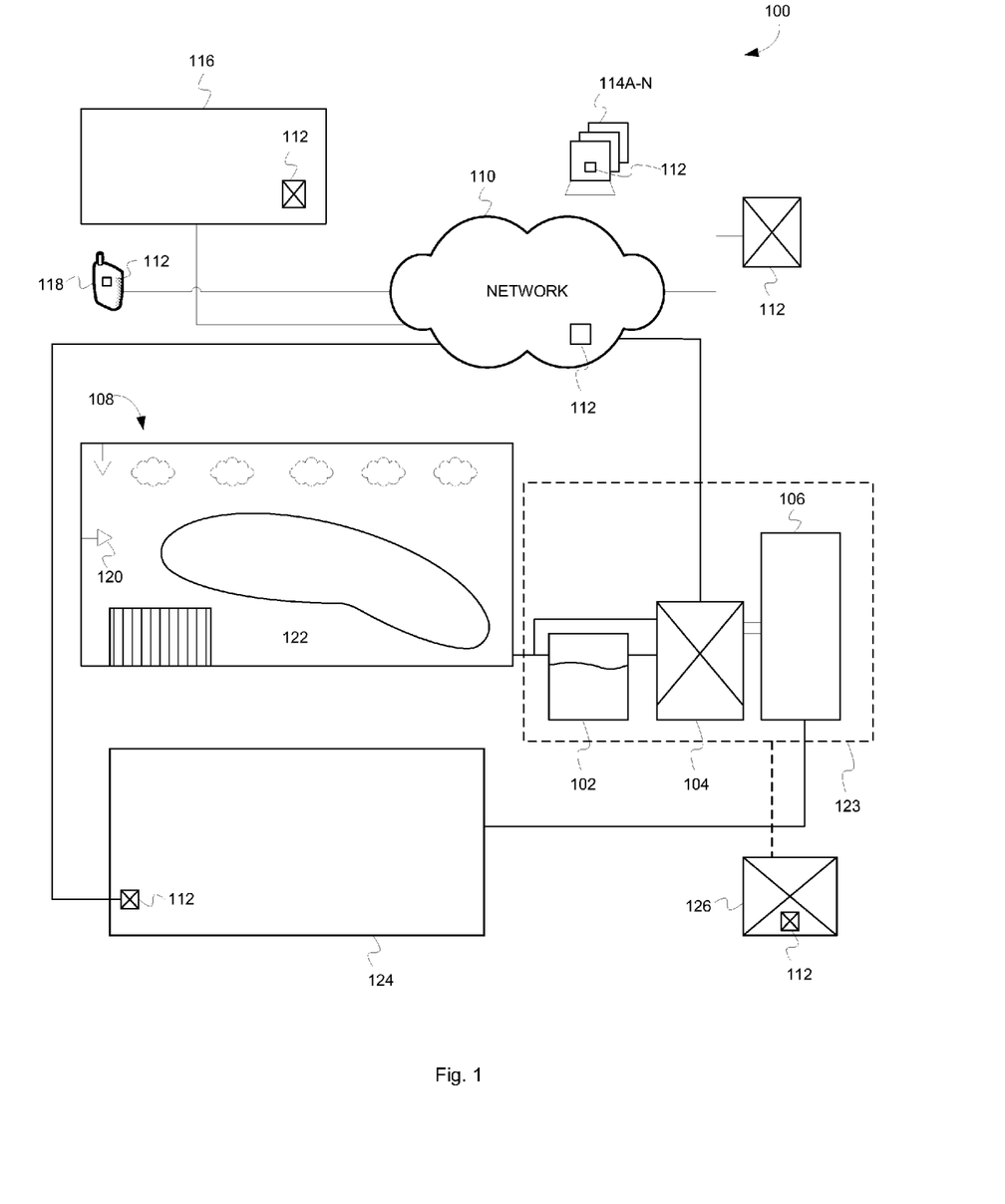
FIG. 1 depicts a block diagram illustrating a mosquito misting control and monitoring system in an embodiment of the invention.

FIG. 1 depicts a block diagram illustrating a mosquito misting system 100, according to some embodiments of the invention. The mosquito misting system 100 may include a chemical reservoir 102, a delivery system 104, a water source 106, a spray system 108, a communications network 110, a misting management unit 112, one or more client computers 114A-N, one or more operator computers 116, and one or more personal digital assistants (PDA) 118. The communication network 110 allows for communication about the mosquito misting system 100, for example, between the misting management unit 112, the one or more client computers 114A-N, the one or more operator computers 116, and the one or more PDAs 118. The communication network 110 may be any suitable communication network, or combination of networks for sending and/or receiving data such as the internet, a telephone line, a wireless system, a cable line, an infrared signal, any network described herein, and the like.

The mosquito misting system 100 may have a location equipment package 123 that is installed proximate a target area 122. The location equipment package 123 may comprise any of the equipment for the mosquito misting system 100 that is installed near the target area 122 for operation. For example, the location equipment package 123 may comprise the chemical reservoir 102, the delivery system 104, the water source 106, and/or the spray system 108. The target area 122 may be any area where it is desired to control the mosquito population. For example, as shown in FIG. 1, the target area is a backyard of a residence 124. The spray system 108 may be installed around, and/or about, the target area 122 in order to control the mosquito population in the target area 122, as will be described in more detail below. Although the target area 122 is shown as a backyard of a residence 124, it should be appreciated that the target area 122 may be any suitable area where controlling the mosquito population is desired such as an office park, a playground, a school, a patio at a restaurant, around a building, a stadium, a campus, and the like.

There may be several target areas 122 controlled by the mosquito misting system 100. For example, the mosquito misting system 100 may control the mosquito population at multiple residences, businesses and schools in a community, state and/or country. To this end, there may be multiple location equipment packages 123 that are installed at several of the target areas 122. Each of the location equipment packages 123 may be monitored, controlled, repaired and/or manipulated by the mosquito misting unit 112. If a few of the target areas 122 are proximate to one another, the proximate target areas 122 may share components of the location equipment packages 123, for example two residences may use the same chemical reservoir 102, the delivery system 104, and/or the water source 106.

The location equipment package 123 may be located proximate each of the target areas 122 in any suitable manner. For example, the location equipment package 123 may be located on a side of the residence 124 that has little, or no traffic, in a garage, in the attic, in a crawlspace, located within the walls of the residence 124 and the like. If the location equipment package 123 is located in a concealed area, for example in the walls of a structure, there may be one or more connection nozzles, and/or one or more controllers 126 for operation and maintenance of the location equipment package 123. The nozzles and/or controllers 126 may be located in a convenient and accessible location about the target area 122.

Although, the mosquito misting system 100 is described as a system for controlling the mosquito population, it should be appreciated that the system 100 may be used to control any pest problem. For example, the mosquito misting system 100 may be used to control fleas, flies, roaches, beetles, ticks, mites, and the like.

Figure 2:
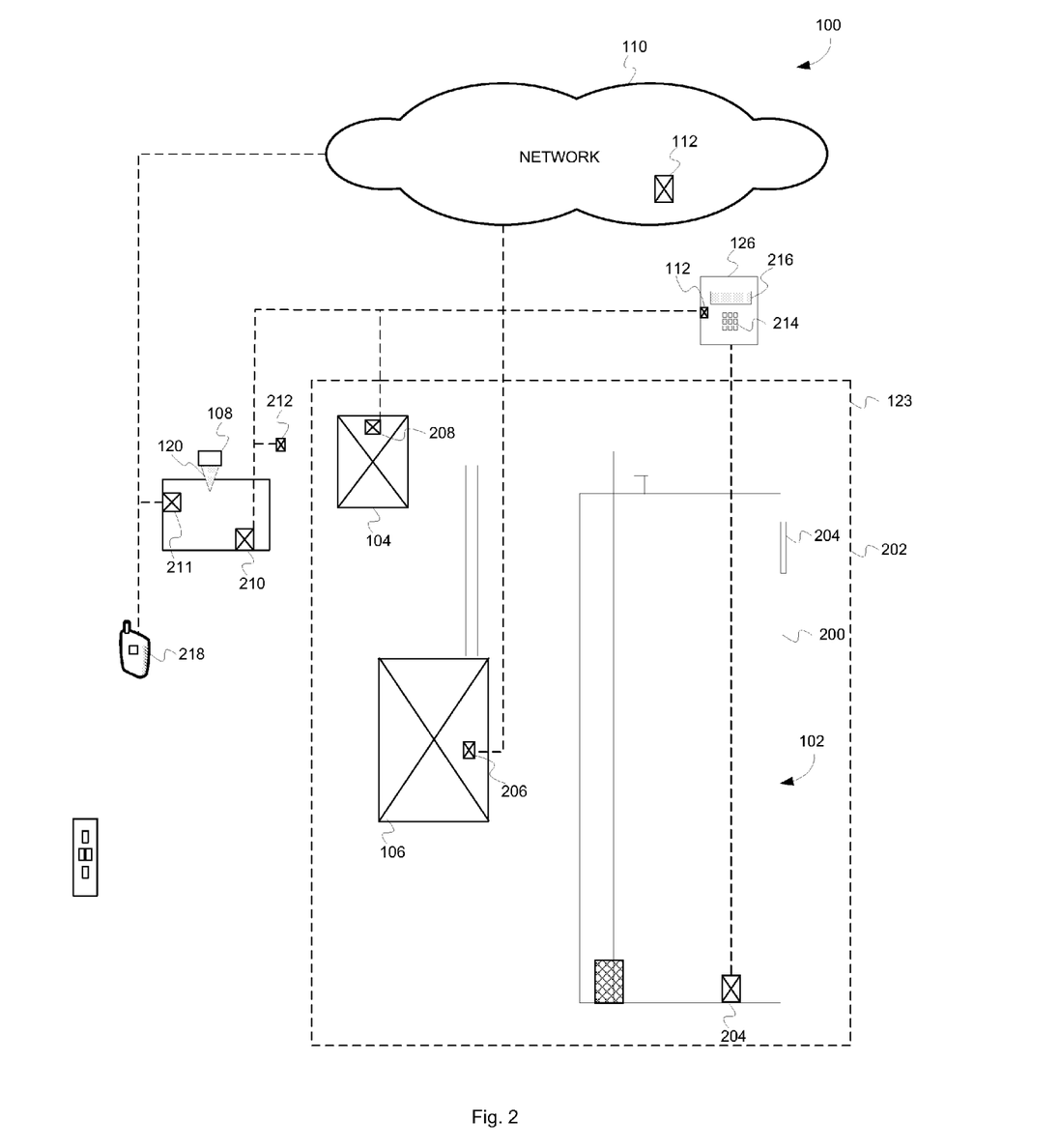
FIG. 2 depicts a block diagram illustrating the mosquito misting control and monitoring system of FIG. 1 in an embodiment of the invention.

FIG. 2 shows a schematic view of the location equipment package 123. The location equipment package 123 may be a self contained unit which houses the chemical reservoir 102, the delivery system 104 and/or the water source 106, or it may be separate units. The chemical reservoir 102 may be any device suitable for storing and dispersing an insecticide. The chemical reservoir 102 may be a separate stand alone unit, or be incorporated with, or integral to the delivery system 104. For example, the delivery system 104 may be located within a tank 200 of the chemical reservoir, or the chemical reservoir 102, the delivery system and/or the water source 106 may be in a housing 202 shown schematically. The chemical reservoir 102 provides the insecticide that is dispersed through the one or more spray nozzles 118 and about the target area 122. The insecticide from the chemical reservoir 102 helps to control the insect population near the spray system 108. The insecticide in the chemical reservoir 104 may be in a pure and/or diluted form. For example, the insecticide may be a fluid that is part chemicals and part water, or all chemicals. The insecticide in the chemical reservoir 102 may comprise any number of chemicals for controlling insect populations. For example, the insecticides may comprise, hydro-py ULD300, Pyronyl 303, a cedar based repellent, Eco Exempt IC2, Riptide, Sector, Eco MC and the like.

The chemical reservoir 102 may include one or more chemical sensors 204 which measure any number of conditions, features, and/or chemical conditions, in the chemical reservoir 102. For example, the one of the chemical sensors 204 may be a level sensor. The level sensor may determine the level of the fluid within the chemical reservoir 102. The level sensor may be located within the chemical reservoir 102, or outside of the chemical reservoir 102. Further, the level of chemicals may be checked through a site glass or gauge on the side of the chemical reservoir 102, the operator checking the level may input the level into the mosquito misting system 100, for example, at the controller 126, the one or more operator computers 116, the one or more client computers 114, and/or the PDA 118.

Further, the one or more chemical sensors 204 may comprise a chemical concentration sensor. The chemical concentration sensor may detect and/or determine, the ratio of chemical in the fluid in the chemical reservoir 102. For example, the chemical concentration sensor may determine that the amount of chemical per the total fluid is at 5%. Further, the one or more chemical sensors may comprise any suitable sensor for determining a condition of the chemical reservoir 102, a condition within the chemical reservoir 102, a condition of the fluid in the chemical reservoir 102 such as, the insecticide level, leak detection, pressure, temperature, the flow rate of insecticide from the chemical reservoir per spray cycle, and the like. The one or more chemical sensors may be in direct communication with the network 110, misting management unit 112 and/or the controller 126.

The water source 106 may be any source of water that may be mixed with the insecticide in order to provide the necessary mixture of insecticide per spray cycle. The water source 106 may dilute the insecticide. Further, the water from the water source 106 may provide a delivery medium for the mosquito misting system 100. For example, the water and insecticide mixture may provide an easily flowable mixture for distributing on the target area 122. In one embodiment, the water source 106 may be the city water line, or hose connection, near the delivery system 104. Further, the water source 106 may be any suitable water source including, but not limited to, water added directly to the chemical reservoir 102, a separate stand alone water tank, and the like. The water source 106, and/or flow lines to and from the water source 106, may include one or more water sensors 206. The water sensors 206 may measure any number of features of the water source 106, and/or flow lines, including, but not limited to, the water level, water pressure, water quality, leaks in the water source, pressure, temperature, and the like. The water sensor 206 may be in direct communication with the misting management unit 112.

The delivery system 104 may be any suitable device for delivering a mix of the insecticide and/or water to the spray system 108. To this end the delivery system 104 may include one or more pumps, timers, control panels, electronic valves, pressure regulators, filters, circuit boards, fittings, tubing, enclosures, reservoirs, containers, gauges, and the like. The delivery system 104 may control the time at which the spray cycle occurs, the amount of insecticide which is used per spray cycle, the amount of water used per spray cycle, the pressure of the mix sent to the spray system 108, and the like. The delivery system 104 may include one or more delivery sensors 208 which may monitor the functions of the delivery system 104. The delivery sensors 208 may monitor any of the features of the delivery system 104 including, but not limited to, the pump function, the amount of insecticide used, the amount of water used, back pressure in the spray system 108 versus applied pressure from the delivery system 104, the temperature of the fluid, the presence of leaks in the spray system, the presence of leaks in the delivery system 104, the motor speed of the pump, and the like. The delivery sensors 208 may be in direct communication with the misting management unit 112.

The spray system 108 may include a plurality of nozzles 120 in fluid communication with the delivery system 104. The nozzles 120 may be capable of producing a mist with the fluid introduced to the nozzles 120. The spray system 108 may include one or more spray sensors 212 which may monitor the functions of the spray system 108 including, but not limited to, nozzle failures, pressure in the spray system. Further, the mosquito misting system 100 may have one or more area sensors 210. The area sensors 210 may determine one or more conditions of the target area 122. For example, the one or more area sensors 210 may determine presence of people and/or pets near the spray nozzles 120, current rain fall in the target area, historical rainfall data in the target area, wind speed in the target area, wind direction in the target area, temperature in the target area, barometric pressure in the target area, and the like. To this end, the area sensors 210 may comprise a rain gauge, an anemometer, a thermometer, a motion detector and the like.

In addition to and/or as an alternative to the motion detectors, there may be one or more bug detection sensors 211, and/or bug detection systems. The bug detection systems 211 may be an input from people in the target area 122 regarding the amount of bug/mosquito activity. Further, the one or more area sensors 210 may have a sensor for detecting the density of the bug and/or mosquito population. For example, the one or more area sensors 210 may be a bug zapper that is configured to send a signal to the misting management unit 112 upon engaging, and/or zapping a bug. Further, the one or more sensors 210 may include a scanner configured to determine the density and/or population of flying insects in the target area 122.

The controller 126 may be coupled directly to the location equipment package 123 for controlling the mosquito misting system 100. The operator and/or owner of the mosquito misting system 100 may input various conditions and operating parameters into the controller 126 in order to control the operation of the mosquito misting system 100. For example, the operator may input spray times, amount of insecticide used during each spray time, weather conditions in which to spray, and the like. The controller 126 may have a keypad 214 and a display 216 for inputting and viewing controller functions. Further, the controller 126 may have any suitable devices and/or connections for operating and/or controlling the mosquito misting system 100, or example, a USB connection, an antennae, and the like. Although the controller 126 is shown as a physical piece of equipment located proximate the location equipment package 123, it should be appreciated that the controller 126 may be located at any suitable location, for example, within the residence, as a remote control, at the operator's location and the like. Further, the controller 126 may be optional, and the entire function of the controller 126 may be controlled by the mosquito misting unit 112. To this end, the owner and/or operator may operate the functions of the mosquito misting system 100 via their computer, a remote control, and/or with the PDA, on site and/or at a remote location as will be described in more detail below.

Each of the sensors may send information to the misting management unit 112 and/or the controller 126. The misting management unit 112 may communicate directly to and from the client's one or more computers 114A-N, the network 110, the operator's one or more computers, and/or the one or more PDAs 118. There may be one or more misting management units 112 located in any suitable location including, but not limited to, the delivery system 104, the client's computer 114, the operator's computer 116, the PDA 118, the network 110, the controller 126, a remote control 218 and the like. The misting management unit 112 may receive the information collected from the sensors, user input, operator input, weather forecasts from the internet, and the like. The mosquito misting unit 112 may control and/or monitor each of the functions of the mosquito misting system 100. Further, upon detecting a problem, the misting management unit 112 may automatically fix the problem, and or notify any of the operator, owner and/or client of the problem as will be discussed in more detail below.

Data may be input into the misting management unit 112 from a number of sources. For example, each of the sensors 204, 206, 208, 210 and 212 may send data to the misting management unit 112. Further, the operator, the owner, user's at the target area 122, may input data into the misting management unit 112. Further still, the misting management unit 112 may obtain information from other target areas 122 in the region, from the internet, from weather reports and the like. For example, the misting management unit 112 may regularly receive data regarding regional weather from the internet, or another source, this may be used to determine spray patterns at the target area 122. The data sent to the misting management unit 112 is herein referred to as misting data.

Figure 3:
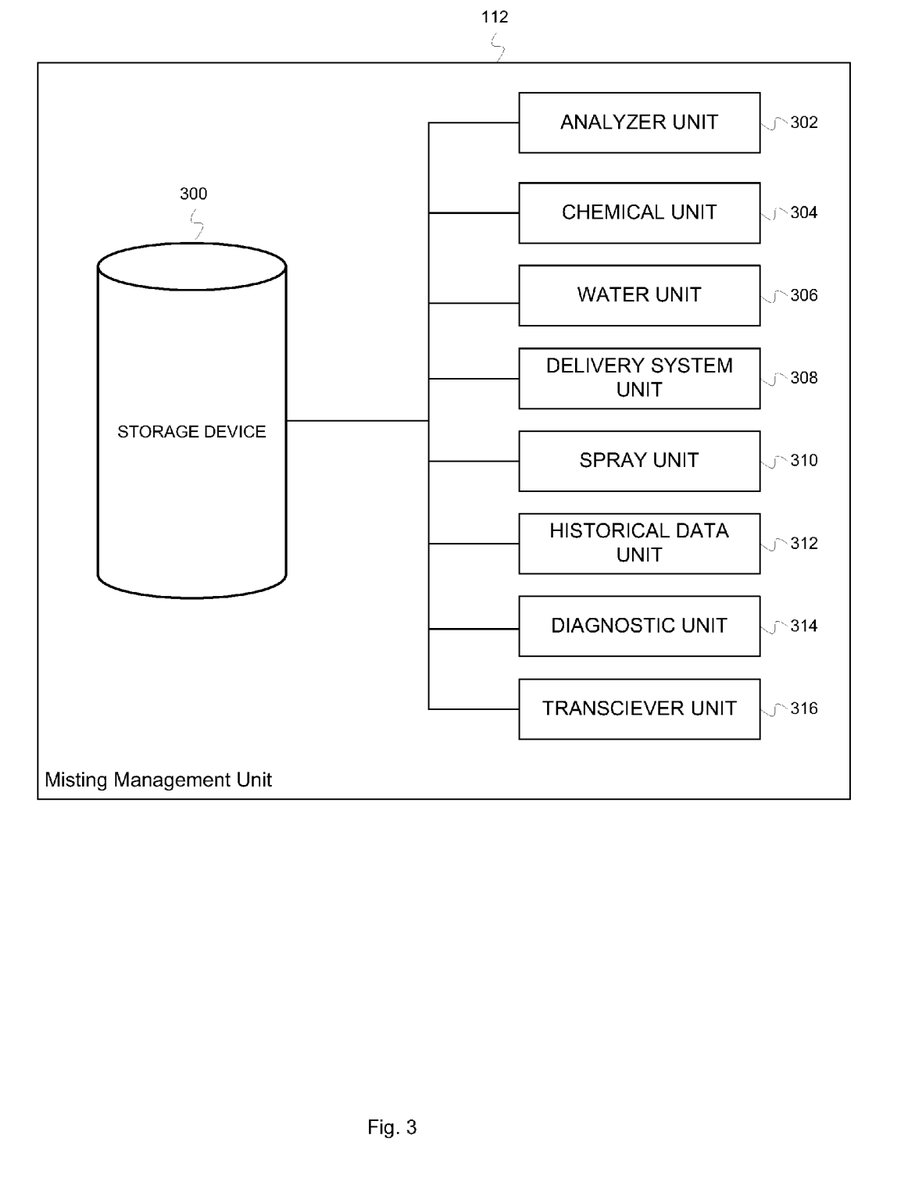
FIG. 3 depicts a diagram illustrating a misting management unit in an embodiment.

The misting management unit 112 is shown in FIG. 3. The misting management unit 112 may include a storage device 300, an analyzer unit 302, a chemical unit 304, a water unit 306, delivery system unit 308, a spray unit 310, a historical data unit 312, a diagnostic unit 314, and a transceiver unit 316. The storage unit 300 allows the misting management unit 112 to store data collected, and/or misting data, from the sensors and/or the operator/owner/client. The analyzer unit 302 may compare the misting data input into the mosquito misting unit 112 in order to determine if any of the systems in the mosquito misting system 100 require maintenance, action and/or repair. The analyzer unit 302 may collect, compare, catalog, analyze, manipulate, and/or categorize the misting data received. The analyzer unit 302 may compare the normal functions of the mosquito misting system 100 to the misting data received. If there is a variance the analyzer unit 302 may determine that a problem has occurred in the mosquito misting system 100. The analyzer unit 302 may then alert any of the computers and/or people described herein of the problem. Further, the analyzer unit 302 may direct the system 100 to adjust itself automatically thereby alleviating the need for owner and/or operator maintenance. The transceiver unit 210 allows the misting management unit 112 to send and receive data from the components of the mosquito misting system 100.

The chemical unit 304 may collect, compare, catalog, analyze, manipulate, and/or categorize the misting data received from the one or more chemical sensors 204, and/or chemical data from the operator and/or owner. From the misting data regarding the chemical reservoir 102, and/or the insecticide, determine a current condition of the chemical reservoir 102. For example, the chemical unit 208 may be capable of determining when the insecticide in the chemical reservoir 102 needs to be replenished. When the insecticide is running low, the chemical unit 208 may alert the client, owner, or maintenance man of the problem. For example, when the chemical unit 208 determines that the insecticide level needs to be replenished, the chemical unit 208 may send data to any of the client's computers 114A-N, the operator's computer 116, the PDA 118, and/or send any alert described herein. The operator's computer 116 may automatically schedule a maintenance visit based on the data from the misting management unit 112. Further, the misting management unit 112 may send the scheduled maintenance information directly to a maintenance technician via maintenance technicians PDA 118. Further, still, the mosquito misting system 100 may automatically check the availability of each of any number of maintenance technicians and then send the maintenance alert directly to the maintenance technician who is the first available, or closest to the target area 122 associated with the particular misting management unit 112. Further, chemical unit 304 may control the insecticide amount in each of the spray cycles based on when the next maintenance is scheduled. For example, if the chemical unit 304 determines that the chemicals are low in the chemical reservoir 102, and that the next available maintenance time is in one week, the chemical unit 304 may ration the remaining insecticide for the remaining week, and/or the time remaining.

Further still, the chemical unit 304 may receive data regarding the insect population from the one or more area sensors 210 as described above. If the insect population is low, the chemical unit 302 may maintain and/or reduce the current amount of insecticide used for each spray cycle, and/or maintain or decrease the number of spray cycles. If the insect population is high and/or increasing, the chemical unit 302 may increase the amount of insecticide, and/or spray cycles. Further, the chemical unit 302 may determine that despite the increased insecticide, and/or spray cycles, that the bug/mosquito population is not decreasing. The chemical unit 302 may then recommend changing the insecticide and/or spray frequency used.

The water unit 306 may collect, compare, catalog, analyze, manipulate, categorize and/or the misting data received from the water sensor 206, personnel input, misting data, and/or data received from the chemical unit 304. The water sensor(s) 206 may detect water pressure, water level, and the like. The water unit 306 may determine the concentration of water to insecticide used for each spray cycle. Further, the water unit 306 may determine, the water pressure used and/or required for each spray cycle. If the water source 106 is a stand alone water tank, the water unit 206 may determine the water level in a similar manner as the chemical unit 304 determines the chemical level. Further, the water unit 206 may make an alert in a similar manner to the chemical unit regarding filling and/or maintaining the water source. If the water source 106 is a water line, the water unit 206 may monitor the water pressure, and/or amount of water supplied to the delivery system 104 via the water sensor 206.

The delivery system unit 308 may collect, compare, catalog, analyze, manipulate, and/or categorize the misting data received from the water sensor 208, personnel input, misting data, and/or data received from the chemical unit 304 and/or the water unit 306. The one or more delivery system sensors 208 may monitor the condition of the delivery system 104 and/or the mix of chemicals and water sent to the spray system 108. For example, the delivery system unit 308 may detect a pump failure, a leak in the spray system 108, and the like. The delivery system unit 308 may make an alert in the event there is a condition detected regarding the functioning of the delivery system 104.

The spray unit 310 may collect, compare, catalog, analyze, manipulate, and/or categorize misting data from received from the spray sensors 212 and/or the area sensors 210. The spray unit 204 may be capable of determining if any features of the spray system 108 are experiencing problems or potential problems. For example, the spray unit 310 may be able to determine if there is a leak in the spray system 108 based on fluid pressure in the system. The spray unit 204 may further be able to determine if one or more of the nozzles are malfunctioning. Further still, the spray unit may receive a signal from the spray sensor notifying the spray unit that a person or pet is located near one or more of the nozzles. In this case, the spray unit 204 may modify the spray cycle of the delivery system 104 until the risk is gone.

Further, the spray unit 310 may control the spray cycles for the spray system 108. The spray cycles may be set to spray at a predetermined time every hour, day, week, month and/or year. The spray unit 310 may monitor, track and/or modify the spray cycles in order to optimize the mosquito misting systems 100. Therefore, the spray unit 310 may modify the spray cycles based on existing, past, or predicted future events at each of the target areas. For example, if the misting management unit 112 determines that there is going to be rain at the target area 122 during a spray cycle, the spray unit 310 may modify the spray cycle in order to delay until the rain has passed. Further, if the spray unit 310 determines that there are people located in the target area, the spray unit 310 may adjust the spray cycle. Further, still if spray unit 310 determines that there is a high mosquito and/or bug population the spray unit 310 may increase the frequency of spray cycles.

The historical data unit 312 may receive misting data, data from the sensors and data from the chemical unit 304, the water unit 306, the delivery system unit 308, and/or the spray unit 310 in order to collect, compare, catalog, analyze, manipulate, and/or categorize a history of each of the mosquito misting systems 100 conditions, equipment conditions, regional conditions, target area conditions and the like. The historical data unit 312 may keep a history of each of the functions and/or conditions of the mosquito misting system 100 in order to track the mosquito misting systems 100. The historical data unit 312 may determine historical patterns for the amount of chemical used, the amount of water used, the time intervals between maintenance and/or chemical fills, the time between spray cycles, the weather patterns in the target area, the times when people are located in the target area, and the like. The historical data from the historical data unit may be used to increase the efficiency of the mosquito misting systems 100 and/or the operators maintenance schedules.

The diagnostic unit 314 may analyze any of the conditions and/or functions of the mosquito misting system 100 and determine a course of action therefrom. The diagnostic unit 314 may receive data from any of the data sources and/or units described herein, for example the misting data, data from the sensors and data from the chemical unit 304, the water unit 306, the delivery system unit 308, and/or the spray unit 310, and/or the historical data unit 312. The received data may be used to diagnose, compare, catalog, analyze, manipulate, and/or categorize the components of the mosquito misting system 100. The conditions, problems and/or potential problems diagnosed in the received data may be determined and a solution, and/or course of action to fix, and/or minimize the problems may be determined. The diagnostic unit 314 may then alert any of the parties described herein of the potential problem, and/or fix the problem with or without an alert. For example, the diagnostic unit 316 may determine that the pump in the delivery system 104 is failing based on low fluid pressure leaving the pump. The diagnostic unit 314 may then alert the operator, who may schedule a maintenance person to fix the problem with the pump, for example by changing a motor of the pump. The diagnostic unit 314 may further limit the number of spray cycles the pump may have to perform until the maintenance person has replaced or fixed the pump. This procedure may be repeated for any of the systems/sensors described herein.

The transceiver unit 316 may allow the misting management unit 112 to send and receive data to and from the various components of the mosquito misting system 100, and between the unit within the misting management unit 112.

The mosquito misting system 100 allows the operator, client and/or owner to be alerted of any system failures, or potential problems with the system 100 in a real time manner. The misting management unit 112 may automatically schedule maintenance and/or service calls to the mosquito misting system 100 based on the data received from the sensors, misting data and/or data manipulated, and/or determined by the misting management unit 112. A maintenance and/or service call may then be automatically scheduled in order to attend to the system. The call may be scheduled based on any number of criteria including but not limited to, expertise of the service technician, first available service technician, the closest service technician, the cheapest service technician, and the like. The mosquito misting system 100 alleviates the need for the owner to routinely check on the level of the insecticide and system functions. For example, the owner may only go to maintain or service the system 100 when a problem in the system is detected and not fixable by the misting management unit.

The alert from the misting management unit 112 may be any suitable alert. For example, the alert may be a light flashing on the control panel 126 (as shown in FIG. 2), an email send to the operator, an email sent to the owner, an email sent to any of the technicians or persons described herein, a text message sent to any person described herein, a phone call sent to any person described herein, an update of a mosquito misting system 100 on a website, an audio alarm at the target area and the like.

Figure 4:
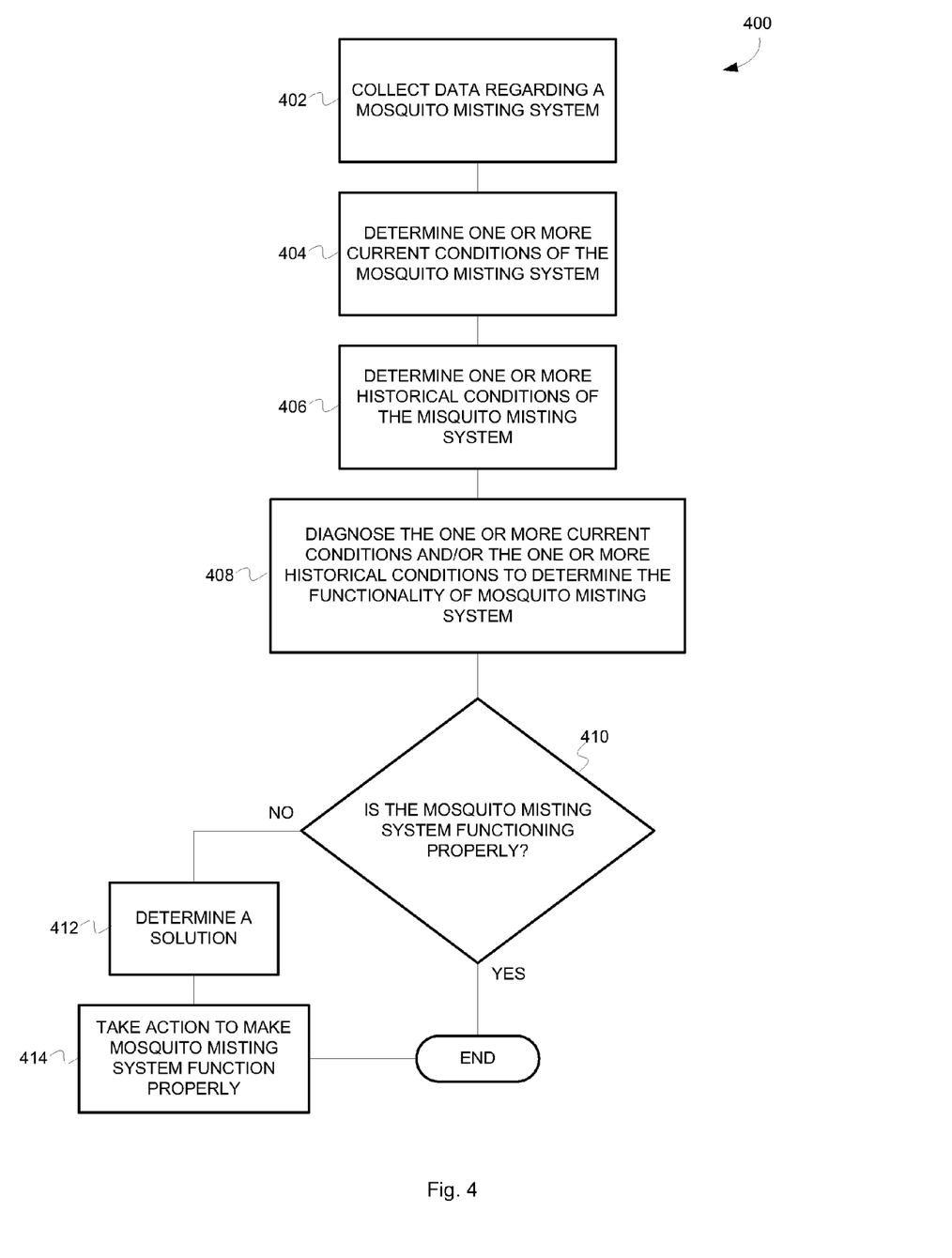
FIG. 4 a flowchart illustrating a method of using the mosquito misting control and monitoring system in an embodiment.

FIG. 4 depicts a flow diagram illustrating the operations of the mosquito misting system 100, according to some embodiments of the invention. The flow 400 begins at block 402, where data is collected regarding the mosquito misting system 100. The data collected may be any data regarding the condition, the operation and/or the historical operation of the mosquito misting system 100. The data may comprise any of the data described herein. The data may be collected by the sensors 204, 206, 208, 210 and/or 212 and sent to the misting management unit 112. The data may be collected from user input to the mosquito misting system, for example, by an operator, a service technician and/or the owner. For example, the service technician may input what type of chemicals have been added to the chemical reservoir, how much of the chemicals have been added and on what day the chemicals were added. Further still, the data collected may be any of the data cataloged, collected and/or manipulated by the misting management unit 112. Further, still the data collected may be regional data from other mosquito misting systems 100, from weather reports, and the like.

The flow continues at block 404 wherein one or more current conditions of the mosquito misting system 100 may be determined. With the collected data, the misting management unit 112 may determine one or more current conditions of the mosquito misting system 100. For example, the misting management unit 112 may determine the level in the chemical reservoir, the type of chemical used, the water pressure in the water supply 106, the water level in the water supply, the time of day, the efficiency of the delivery system, any leaks detected in the chemical reservoir, the water supply, the delivery system, the spray system, and/or the nozzles, the current spray cycle intervals, current spray cycle volumes, current mix of chemicals in each spray cycle, the presence of people in the target area, the wind speed at the target area, the current precipitation at the target area, the predicted weather at the target area, the temperature at the target area, the pressure in the spray system, upcoming events scheduled at the target area, upcoming maintenance schedules for the location equipment package, and the like. The current condition(s) of the mosquito misting system 100 may be used when diagnosing the overall operation and efficiency of the mosquito misting system 100 as will be described in more detail below.

The flow optionally continues at block 406 wherein one or more historical conditions of the mosquito misting system 100 may be determined. With the collected data and the current conditions, the historical data unit 312 of the misting management unit 112 may determine one or more historical conditions, trends, and/or patterns of the mosquito misting system 100. For example, the historical data unit 312 may determine chemical consumption trends, chemical effectiveness trends, effectiveness of chemical concentrations used in target area, spray cycle trends, maintenance history, maintenance trends, history of human traffic in target area, weather trends at target area, and the like. The historical conditions of the mosquito misting system 100 may be used when diagnosing the overall operation and efficiency of the mosquito misting system 100.

The flow continues at block 408 wherein the diagnostic unit 314 of the mosquito misting system 100 determines the functionality of the mosquito misting system 100 based on the one or more current conditions and/or the historical conditions. The diagnostic unit 314 may determine if the operation of the mosquito misting system 100 is running efficiently. Further, the diagnostic unit 314 may develop ways to modify the current operation of the mosquito misting system 100 in order to optimize the use of the system. For example, the diagnostic unit 314, may determine that the chemical level is low, the chemical concentration per spray cycle is ineffective, the spray cycle density (or time between spray cycles) is ineffective, there are one or more humans in the target area, there is a leak in the mosquito misting system, the water pressure is low, the water level is low, the delivery system is performing inefficiently, the mosquito misting system is performing efficiently, and the like.

The flow continues at block 410 where it is determined if the mosquito misting system is functioning properly. If the mosquito misting system is functioning properly the flow may end. If the mosquito misting system is not functioning properly, efficiently and/or optimally, the flow may continue at block 412, wherein a solution is determined. The diagnostic unit 314 may determine a solution and/or a course of action for any of the problems and/or conditions found in the mosquito misting system. The solutions determined for the mosquito misting system by the diagnostic unit 314 may comprise alerting a service technician to come and repair, and/or refill the mosquito misting system, changing the spray cycle intervals, changing the spray cycle concentrations, changing the spray cycles to spray only water, temporarily stopping and/or altering the spray cycles, sounding an alert and/or alarm in the target area, and the like.

With the solution determined, the flow continues at block 412 wherein an action may be taken to ensure the mosquito misting system is functioning properly. For example, the diagnostic unit 314 may send a service technician to repair the mosquito misting system 100, alert any of the people described herein, adjust the spray times and spray on demand, spray water only, suspend operation for a time period (for example 24 hours), reprogram the timer and/or clock, enable or disable leak detection, enable or disable alarm or alert prior to spraying, purge the chemical in the reservoir, remove automatic spray times, adjust automatic spray times, and the like. Once the mosquito misting system is operating properly, the flow may end at block 414.

Figure 5:
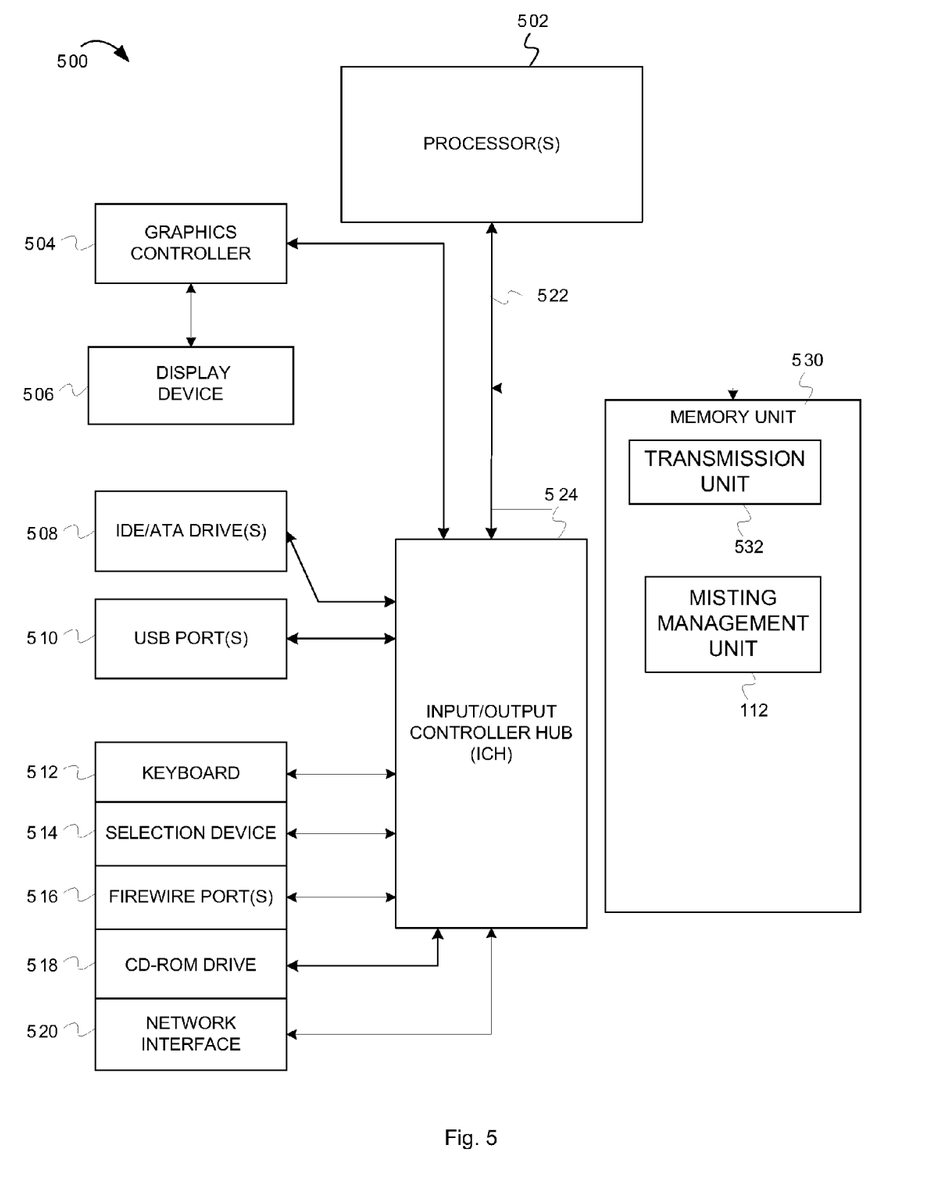
FIG. 5 is a schematic diagram of a computer system in an embodiment.

FIG. 5 depicts an example computer system that can embody a misting management unit, according to some embodiments of the invention. A computer system 500 includes a processor unit 502 (possibly including multiple processors, multiple cores, multiple nodes, and/or implementing multi-threading, etc.). The computer system includes memory 530. The memory 530 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 522 (e.g., PCI, ISA, PCI-Express, HyperTransport®, InfiniBand®, NuBus, etc.), a network interface 520 (e.g, an Ethernet interface, a Frame Relay interface, SONET interface, wireless interface, etc.), and a storage device(s) (e.g., optical storage, magnetic storage, etc.)

The system memory 530 may include any portion of the misting management unit 112 to facilitate the functionality described herein. Some or all of the functionality of the mosquito misting system 100 may be implemented with code embodied in the system memory 530 and/or processor unit 502. Any one of these functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 3 (e.g., video cards, audio cards, additional network interfaces, peripheral devices, etc.). The processor unit 502, the storage device(s), and the network interface 520 are coupled to the bus 522. Although illustrated as being coupled to the bus 522, the memory 530 may be coupled to the processor unit 502.

While the embodiments are described with reference to various implementations and exploitations, it will be understood that these embodiments are illustrative and that the scope of the inventive subject matter is not limited to them. In general, techniques for mosquito misting diagnostics and repair as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for controlling an insect population at a target area with a misting system for spraying an insecticide, the method comprising:
   dispensing the insecticide at the target area;
   collecting data regarding the misting system;
   determining at least one current condition of the misting system;
   diagnosing a current functionality of the misting system;
   detecting a low level of the insecticide in a chemical reservoir of the misting system;
   alerting an operator of the low level of the insecticide in the chemical reservoir by sending the operator an alert through the interne with instructions to fill the chemical reservoir;
   determining an amount of time until the operator fills the chemical reservoir and rationing an amount of insecticide dispensed by the misting system based on a level of the insecticide remaining in the chemical reservoir and an amount of time remaining until the chemical reservoir is filled;
   automatically determining at least one historical condition of the misting system; and
   automatically changing a spray cycle based on the automatically determined historical condition as needed to optimize operating efficiency of the mosquito misting system.

2. An apparatus for controlling an insect population with a misting system configured to spray an insecticide at a target area, the apparatus comprising:
   a chemical unit configured to monitor at least one condition in a chemical reservoir that contains insecticide;
   a historical data unit configured to automatically collect data regarding the operation of the misting system;
   a diagnostic unit configured to diagnose a functionality of the misting system and take an action to optimize the functionality of the misting system;
   a plurality of sensors configured to provide the diagnostic unit with data regarding the misting system, the plurality of sensors comprising:

a chemical sensor configured to determine a level of insecticide in the chemical reservoir;

a water sensor configured to determine a water pressure of a volume of water from a water source to be mixed with the insecticide in the misting system;

a delivery sensor configured to determine an operability of a pump for delivering the volume of water and insecticide to the target area;

a first area sensor configured to determine a temperature at the target area;

a second area sensor configured to determine a wind direction at the target area;

a third area sensor configured to determine a presence of people at the target area; and a bug detection sensor configured to determine a current insect population density at the target area.

3. The apparatus of claim 2, further comprising a water unit configured to monitor at least one condition of the water source.

4. The apparatus of claim 3, further comprising a delivery system unit configured to monitor at least one condition of the delivery system.

5. The apparatus of claim 4, further comprising a spray unit configured to monitor at least one condition of the spray system.

6. A mosquito misting system for controlling a mosquito population a target area, the mosquito misting system comprising:

a chemical reservoir for storing an insecticide to be delivered to the target area;

a water source for providing a volume of water to be mixed with the insecticide prior to delivery to the target area;

a delivery system for delivering the volume of water and insecticide to the target area;

a spray system for distributing the volume of water and the insecticide about the target area;

a plurality of sensors for collecting data regarding the mosquito misting system, the plurality of sensors comprising:

a chemical sensor configured to determine a level of insecticide in the chemical reservoir;

a water sensor configured to determine a water pressure of a volume of water from a water source to be mixed with the insecticide in the misting system;

a delivery sensor configured to determine an operability of a pump for delivering the volume of water and insecticide to the target area;

a first area sensor configured to determine a temperature at the target area;

a second area sensor configured to determine a wind direction at the target area;

a third area sensor configured to determine a presence of people at the target area; and a bug detection sensor configured to determine a current insect population density at the target area; and a misting management unit for remotely controlling the operation of the mosquito misting system, the misting management unit comprising:

a chemical unit configured to monitor at least one condition in the chemical reservoir;

a historical data unit configured to automatically collect data regarding the operation of the misting system; and a diagnostic unit configured to diagnose a functionality of the misting system and take an action to optimize the functionality of the misting system.

7. The mosquito misting system of claim 6, wherein the third area sensor further comprises a motion detector in the target area.

8. The mosquito misting system 6, wherein the misting management unit further comprises a water unit configured to monitor at least one condition of the water source.

9. The mosquito misting system 8, wherein the misting management unit further comprises a delivery system unit configured to monitor at least one condition of the delivery system and a spray unit configured to monitor at least one condition of the spray system.

10. The mosquito misting system of claim 6, further comprising one or more operator computers for remotely communicating with the misting management unit using the interne.

11. The method of claim 1, wherein the historical condition comprises temperature trends and insect population density trends that are automatically collected by a historical data unit.

12. The method of claim 1, further comprising automatically determining a weather forecast from the interne and automatically changing the spray cycle based on the automatically determined weather forecast.

13. The method of claim 1, further comprising sensing an insect density in the target area using a sensor and automatically changing the amount of insecticide dispensed based on the insect density in the target area.

14. The apparatus of claim 2, wherein the functionality of the misting system is an automatically determined weather condition determined from a weather forecast from the internet and the action taken is changing the spray cycle based on the automatically determined weather condition.

15. The mosquito misting system of claim 6, wherein the functionality of the misting system is an automatically determined weather condition determined from a weather forecast from the internet and the action taken is changing the spray cycle based on the automatically determined weather condition.

16. The method of claim 1, further comprising:

detecting a temperature in the chemical reservoir using a chemical sensor;

detecting a water pressure and a water temperature using a plurality of water sensors;

detecting a back pressure in a spray system which includes a mixture of the insecticide and a volume of water using a water sensor;

detecting current insect population using a bug detection sensor; and detecting a current wind speed using an area sensor.

17. The apparatus of claim 2, wherein the functionality of the misting system is automatically determining an amount of insecticide remaining in the chemical reservoir using the chemical sensor and wherein the diagnostic unit is configured to alert an operator of a low level of insecticide, determine an amount of time remaining until the operator can fill the chemical reservoir and ration the remaining insecticide based on the time remaining.

* * * * *